US010334120B2

(12) United States Patent
Michishita (10) Patent No.: US 10,334,120 B2
(45) Date of Patent: Jun. 25, 2019

(54) PRINTING APPARATUS TO WHICH OPTIONAL UNIT IS CONNECTED, PROGRAM UPDATE METHOD FOR PRINTING APPARATUS, AND STORAGE MEDIUM (71) Applicant: CANON KABUSHIKI KAISHA, Tokyo (JP)

(72) Inventor: Takumi Michishita, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/660,391

(22) Filed: Jul. 26, 2017

(65) Prior Publication Data
US 2017/0324873 A1 Nov. 9, 2017

Related U.S. Application Data (63) Continuation of application No. 14/704,427, filed on May 5, 2015, now Pat. No. 9,749,478.

(30) Foreign Application Priority Data

May 14, 2014 (JP) ................. 2014-100379

(51) Int. Cl.
H04N 1/00 (2006.01)
G06F 3/12 (2006.01)
(Continued)

(52) U.S. Cl.
CPC ............ H04N 1/00 (2013.01); G06F 3/121 (2013.01); G06F 3/123 (2013.01); G06F 8/65 (2013.01);
(Continued)

(58) Field of Classification Search
CPC .. H04N 1/00; H04N 1/00244; H04N 1/00344; H04N 1/00188; H04N 1/00649; G06F 3/121; G06F 3/123; G06F 8/65
See application file for complete search history.

(56) References Cited

U.S. PATENT DOCUMENTS

2003/0231333 A1   12/2003  Nakamura et al.
2004/0187025 A1*  9/2004  Tachiyama ............ H04L 41/082
                                                      726/4

(Continued)

FOREIGN PATENT DOCUMENTS

JP      2001216167 A    8/2001
JP      2005301445 A    10/2005

(Continued)

OTHER PUBLICATIONS

Notice of Allowance issued in U.S. Appl. No. 14/704,427 dated Oct. 7, 2015.

(Continued)

Primary Examiner — Iriana Cruz
(74) Attorney, Agent, or Firm — Rossi, Kimms & McDowell LLP (57) ABSTRACT A technique that guarantees update of a program of a finisher unit while preventing a malfunction thereof from being caused by erroneous attachment thereof to a printing apparatus. Hardware identification information is acquired from the finisher unit. When it is determined based on the acquired hardware identification information that the finisher unit is compatible with a program of the apparatus, program identification information is acquired from the optional unit, for determining based thereon whether a program of the finisher unit program is associated with the program of the printing apparatus. If the programs are associated with each other, the versions there are compared. If the versions are not compatible, the program of the (Continued)

finisher unit is updated to a version compatible with the version of the program of the printing apparatus.

5 Claims, 5 Drawing Sheets (51) Int. Cl.
G06F 9/445 (2018.01)
G06F 8/65 (2018.01)
(52) U.S. Cl.
CPC ..... *H04N 1/00188* (2013.01); *H04N 1/00244* (2013.01); *H04N 1/00344* (2013.01); *H04N 1/00649* (2013.01); *H04N 1/00962* (2013.01)

(56) References Cited

U.S. PATENT DOCUMENTS

| | | |
|---|---|---|
| 2008/0184151 A1 | 7/2008 | Agarwal et al. |
| 2010/0011348 A1 | 1/2010 | Honma et al. |
| 2010/0315670 A1 | 12/2010 | Kojima |
| 2012/0011494 A1 | 1/2012 | Suwabe |
| 2012/0072896 A1* | 3/2012 | Watanabe .............. H04N 7/163 717/170 |
| 2012/0331458 A1 | 12/2012 | Kline et al. |
| 2014/0160508 A1 | 6/2014 | Suwabe |

FOREIGN PATENT DOCUMENTS

| | | |
|---|---|---|
| JP | 2012008864 A | 1/2012 |
| JP | 2012203801 A | 10/2012 |

OTHER PUBLICATIONS

Office Action issued in U.S. Appl. No. 14/704,427 dated Mar. 21, 2016.
Office Action issued in U.S. Appl. No. 14/704,427 dated Jun. 30, 2016.
Office Action issued in U.S. Appl. No. 14/704,427 dated Oct. 6, 2016.
Notice of Allowance issued in U.S. Appl. No. 14/704,427 dated Apr. 27, 2017.
Office Action issued in Japanese Application No. 2018-128292 dated Apr. 23, 2019.

* cited by examiner

PRINTING APPARATUS TO WHICH OPTIONAL UNIT IS CONNECTED, PROGRAM UPDATE METHOD FOR PRINTING APPARATUS, AND STORAGE MEDIUM

BACKGROUND OF THE INVENTION

Field of the Invention

The present invention relates to a printing apparatus to which an optional unit is connected, a program update method for the printing apparatus, and a storage medium, and more particularly to a technique for updating a program of the optional unit for expanding functions of a multifunction peripheral or the like.

Description of the Related Art

In a general multifunction peripheral, a controller unit for controlling the overall operation of the multifunction peripheral includes a CPU (Central Processing Unit), while some of optional units that are used by being connected to the main unit of the multifunction peripheral are also equipped with CPUs, respectively. The CPUs of such optional units realize various optional functions, such as a FAX function and a finishing function, by reading out and executing programs associated with the functions, e.g. from ROMs of the optional units. To this end, when such an optional unit is connected to the apparatus main unit, a program executed by the CPU of the optional unit is required to be updated such that the program is compatible with a program executed by the CPU of the controller unit in association therewith.

Further, there is a case where even when the hardware configuration of an optional unit is the same, the optional unit is operated by being connected to an apparatus main unit having a different function, by rewriting the program of the optional unit.

To prevent occurrence of problems due to incompatibility between a version of the program of the apparatus main unit and a version of the program of the optional unit, there has been proposed, for example, a method disclosed in Japanese Patent Laid-Open Publication No. 2012-008864. This publication discloses the method in which the latest firmware (program) of a camera (apparatus main unit) is downloaded in advance to a cradle (optional unit) for the camera, and when the camera is connected, if the version of the firmware for the camera is old, the firmware is automatically updated.

Further, Japanese Patent Laid-Open Publication No. 2012-203801 proposes a method in which when a vehicle-mounted apparatus and a communication apparatus are caused to operate in cooperation with each other, the communication apparatus downloads, based on the version numbers of respective programs installed on the apparatuses for cooperative operation, one of a combination of appropriate versions of the programs, which is to be updated, from a server, and thereby performs upgrading of the to-be-updated one of the programs.

An operation to be realized by an optional unit is sometimes different depending on the different hardware configuration and functions of the apparatus main unit, and it is necessary to enable the optional unit to accommodate a difference in the operation by modifying a program of the optional unit. For example, in the case of a finisher unit, to prevent stackability of a discharge tray thereof from being degraded due to sheet curl caused by differences in the amount of toner application and sheet discharge speed from an apparatus main unit (image forming apparatus), a modification is made to a program that controls the sheet conveying speed and the distance between adjacent sheets being conveyed. In the case of a scanner unit, it is necessary to prepare programs that are compatible with different printing performances and scanning speeds of different apparatus main units, respectively.

However, in general, the program storage capacity of the ROM of an optional unit is small, so that it is difficult to store a multiplicity of programs in the ROM. For this reason, to adapt the optional unit to the apparatus main unit different in function, it is necessary to cause the ROM to store a program compatible with the apparatus main unit on an as-needed basis. As a consequence, if an optional unit similar in shape but different in the specifications of a program stored in its ROM is erroneously connected to the apparatus main unit, there is a fear that the optional unit cannot exhibit a desired function or performance. Further, there is a possibility that the program of the apparatus main unit and the program of the optional unit are not compatible with each other, sometimes causing an unexpected operation, and even a failure of the optional unit.

The method disclosed in Japanese Patent Laid-Open Publication No. 2012-008864, in which the version of the program of the camera connected to the cradle is updated when the program is old, can always update the program for the camera to a later version.

However, the disclosed method does not provide control of notifying, in a case where the program of the optional unit is different from a program expected by a user, the user of this fact, and updating the program on an as-needed basis. Therefore, it is sometimes impossible to cope with the case where it is desired that an optional unit having the same hardware is caused to store a different program to thereby cause the same to perform a different operation.

The method disclosed in Japanese Patent Laid-Open Publication No. 2012-203801, in which the communication apparatus capable of communicating with a server downloads one of an appropriate combination of versions of the programs whereby the to-be-updated program is updated, has an inconvenience that e.g. in an environment where the communication apparatus is not connected to a network, it is sometimes impossible to execute program update so as to cause the programs of the apparatuses to have an appropriate combination of respective program versions.

SUMMARY OF THE INVENTION

The present invention provides a technique that guarantees update of a program of an optional unit, and prevents a malfunction of the optional unit from being caused by erroneous attachment of the optional unit by a user or a service technician.

In a first aspect of the present invention, there is provided a printing apparatus comprising a printing unit configured to perform printing, a connection unit configured to connect a finisher unit that performs finishing processing on sheets on which printing has been performed, to the printing apparatus, a first acquisition unit configured to acquire hardware identification information from the finisher unit, a first determination unit configured to determine, based on the hardware identification information acquired by the first acquisition unit, whether or not hardware of the finisher unit is compatible with a program of the printing apparatus, a second acquisition unit configured to acquire program identification information from the finisher unit, in a case where it is determined by the first determination unit that the hardware of the finisher unit is compatible with the program of the printing apparatus, a second determination unit configured to determine, based on the program identification information acquired by the second acquisition unit, whether or not a program of the finisher unit is associated with the program of the printing apparatus, a comparison unit configured to compare a version of the program of the finisher unit and a version of the program of the printing apparatus, in a case where it is determined by the second determination unit that the program of the finisher unit is associated with the program of the printing apparatus, and an update unit configured to update the program of the finisher unit to a version thereof compatible with the version of the program of the printing apparatus, in a case where it is determined from a result of comparison by the comparison unit that a combination of the version of the program of the finisher unit and the version of the program of the printing apparatus is not a proper combination.

In a second aspect of the present invention, there is provided a program update method for a printing apparatus including a printing unit configured to perform printing and a connection unit configured to connect a finisher unit that performs finishing processing on sheets on which printing has been performed, to the printing apparatus, comprising acquiring hardware identification information from the finisher unit, determining, based on the acquired hardware identification information, whether or not hardware of the finisher unit is compatible with a program of the printing apparatus, acquiring program identification information from the finisher unit, in a case where it is determined that the hardware of the finisher unit is compatible with the program of the printing apparatus, determining, based on the acquired program identification information, whether or not a program of the finisher unit is associated with the program of the printing apparatus, comparing a version of the program of the finisher unit and a version of the program of the printing apparatus, in a case where it is determined that the program of the finisher unit is associated with the program of the printing apparatus, and updating the program of the finisher unit to a version thereof compatible with the version of the program of the printing apparatus, in a case where it is determined, from a result of said comparing, that a combination of the version of the program of the finisher unit and the version of the program of the printing apparatus is not a proper combination.

In a third aspect of the present invention, there is provided a non-transitory computer-readable storage medium storing a computer-executable program for executing a program update method for a printing apparatus including a printing unit configured to perform printing and a connection unit configured to connect a finisher unit that performs finishing processing on sheets on which printing has been performed, to the printing apparatus, wherein the program update method comprises acquiring hardware identification information from the finisher unit, determining, based on the acquired hardware identification information, whether or not hardware of the finisher unit is compatible with a program of the printing apparatus, acquiring program identification information from the finisher unit, in a case where it is determined that the hardware of the finisher unit is compatible with the program of the printing apparatus, determining, based on the acquired program identification information, whether or not a program of the finisher unit is associated with the program of the printing apparatus, comparing a version of the program of the finisher unit and a version of the program of the printing apparatus, in a case where it is determined that the program of the finisher unit is associated with the program of the printing apparatus, and updating the program of the finisher unit to a version thereof compatible with the version of the program of the printing apparatus, in a case where it is determined, from a result of said comparing, that a combination of the version of the program of the finisher unit and the version of the program of the printing apparatus is not a proper combination.

According to the present invention, the update of a program of an optional unit is guaranteed, and a malfunction of the optional unit is prevented from being caused by erroneous attachment of the optional unit by a user or a service technician.

Further features of the present invention will become apparent from the following description of exemplary embodiments (with reference to the attached drawings).

BRIEF DESCRIPTION OF THE DRAWINGS

FIGS. 4A to 4C are diagrams of examples of screens displayed on a console section, in which

DESCRIPTION OF THE EMBODIMENTS

The present invention will now be described in detail below with reference to the accompanying drawings showing embodiments thereof.

Figure 1:
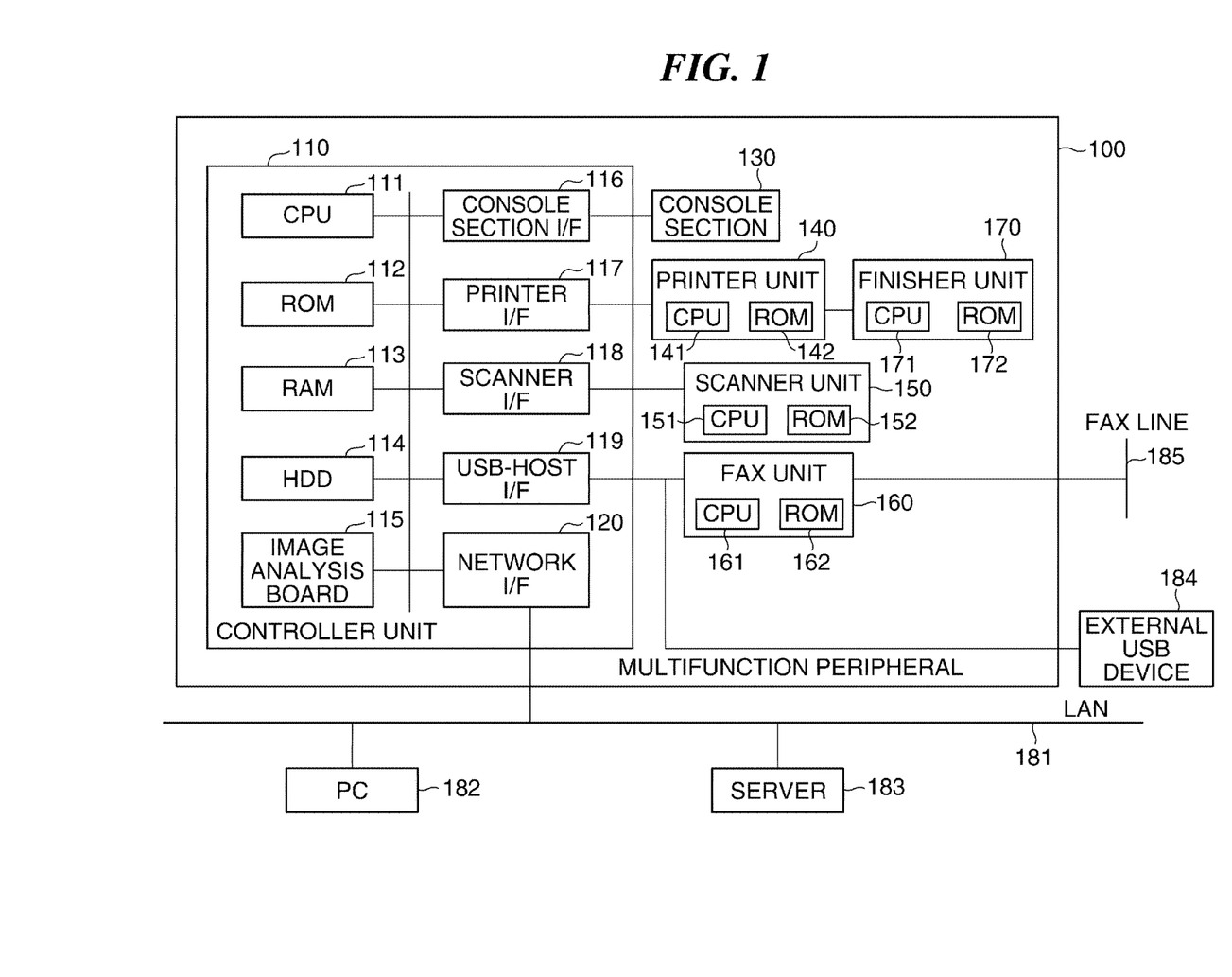
FIG. 1 is a schematic block diagram of a multifunction peripheral as a printing apparatus according to a first embodiment of the present invention.

FIG. 1 is a schematic block diagram of a multifunction peripheral as a printing apparatus according to a first embodiment of the present invention.

Referring to FIG. 1, the multifunction peripheral 100 is comprised of a controller unit 110, a console section 130, a printer unit 140, a scanner unit 150, a FAX unit 160, and a finisher unit 170.

The controller unit 110 is configured to control the overall operation of the multifunction peripheral 100, and includes components described hereafter.

A CPU 111 loads programs stored in a ROM 112 into a RAM 113, and executes the programs. The ROM 112 stores not only the programs but also apparatus information, such as license information, apparatus configuration information, and program version information. An HDD (Hard Disk Drive) 114 stores e.g. image data received from outside.

The programs executed by the CPU 111 include a program corresponding to a printer controller 212, referred to hereinafter. This program converts image data stored in the HDD 114 to image data printable by the printer unit 140, and stores the image data in the HDD 114 again. Further, the programs executed by the CPU 111 include a program corresponding to a scanner controller 213, referred to hereinafter. This program reads image data using the scanner unit 150, and stores the read image data in the HDD 114.

An image analysis board 115 analyzes image data read by the scanner unit 150, reads copy inhibition information or the like from the image data, and then transmits an instruction e.g. of whether to print the image data by the printer unit 140, to the CPU 111.

A console section interface 116 provides interface for transmitting an instruction input by a user of the multifunction peripheral 100 via the console section 130, to the CPU 111. Further, the console section interface 116 receives details of processing for changing a display on the console section 130 from the CPU 111, and transmits the details of the processing to the console section 130.

The console section 130 includes a liquid crystal display equipped with a touch panel function, a keyboard, and so forth, and receives an operation instruction from a user.

A printer interface 117 provides interface for connection between the controller unit 110 and the printer unit 140.

The printer unit 140 performs printing on a sheet based on image data transferred from the HDD 114 via the printer interface 117.

The finisher unit 170 performs various types of finishing processing on sheets printed by the printer unit 140. Examples of the finishing processing include stapling processing, punching processing, saddle-stitch bookbinding processing, and so forth, which are performed on sheets.

A scanner interface 118 provides interface for connection between the controller unit 110 and the scanner unit 150.

The scanner unit 150 reads an image on an original as image data using a line sensor comprised of CCDs (Charge Coupled Devices). The scanner unit 150 transfers the read image data to the HDD 114 via the scanner interface 118, for storage therein. The image data stored in the HDD 114 can be printed by the printer unit 140. Further, by printing the image data read by the scanner unit 150 using the printer unit 140, it is possible to copy the image data.

A USB-Host interface 119 provides interface for connection between the controller unit 110 and the FAX unit 160.

The FAX unit 160 performs FAX transmission via a FAX line 185 based on image data transferred from the HDD 114 via the USB-Host interface 119. Further, the FAX unit 160 generates image data based on data received via the FAX line 185, and transfers the image data to the HDD 114 via the USB-Host interface 119. The image data stored in the HDD 114 is printed on a sheet by the printer unit 140. Note that the USB-Host interface 119 can also be connected to an external USB device 184. The external USB device 184 is a USB memory or a USB keyboard, for example.

A network interface 120 connects the controller unit 110 to a LAN 181, and performs communication with a PC 182 and a server 183 on the LAN.

The PC 182 is capable of performing various operations, such as transmission of image data to the multifunction peripheral 100, and operation of devices of the multifunction peripheral 100 via a Web browser.

Latest versions of programs necessary for multifunction peripherals and the like are always uploaded to the server 183. The multifunction peripheral 100 can send a request to the server 183 to thereby download latest versions of programs for update. Although in the present embodiment, a description will be given of a case in which programs stored in the ROM are updated to latest versions thereof by acquiring the latest versions from the server 183, it is also possible to update the programs without connecting the multifunction peripheral 100 to the server 183.

It is possible to connect the multifunction peripheral 100 to the server 183 via the LAN 181 to download an update file necessary for updating programs. To download the update file, it is preferable to use a method by HTTP (Hyper Text Transfer Protocol) or FTP (File Transfer Protocol), but protocols to be used are not limited to these.

The printer unit 140, the scanner unit 150, the FAX unit 160, and the finisher unit 170 are provided with CPUs 141, 151, 161, and 171, and ROMs 142, 152, 162, and 172, respectively. These CPUs and ROMs are not so large in scale as the CPU 111 and the ROM 112 of the controller unit 110. The CPUs read programs stored in respective associated ones of the ROMs, and perform device control and communication with other devices. When performing program upgrade, each of the programs stored in the ROMs 142, 152, 162, and 172 can also be a target to be upgraded.

The printer unit 140, the scanner unit 150, the FAX unit 160, and the finisher unit 170 are configured to be capable of being removably attached to the main unit of the multifunction peripheral 100. Note that the finisher unit 170 is configured to be capable of being removably attached only to the printer unit 140.

When an optional unit is connected to the main unit of the multifunction peripheral 100, there is a possibility that a combination of a program stored in a ROM of the optional unit for operation thereof and a program stored in the ROM 112 of the controller unit 110 for operation thereof is not a guaranteed combination.

In such a case, it is necessary to update at least one of the program stored in the ROM of the optional unit and the program stored in the ROM 112 of the controller unit 110. Note that in the following description, the printer unit 140, the scanner unit 150, the FAX unit 160, and the finisher unit 170 are each generically referred to as an optional unit.

Next, program groups stored in the ROM 112 of the controller unit 110 will be described with reference to FIG. 2.

Figure 2:
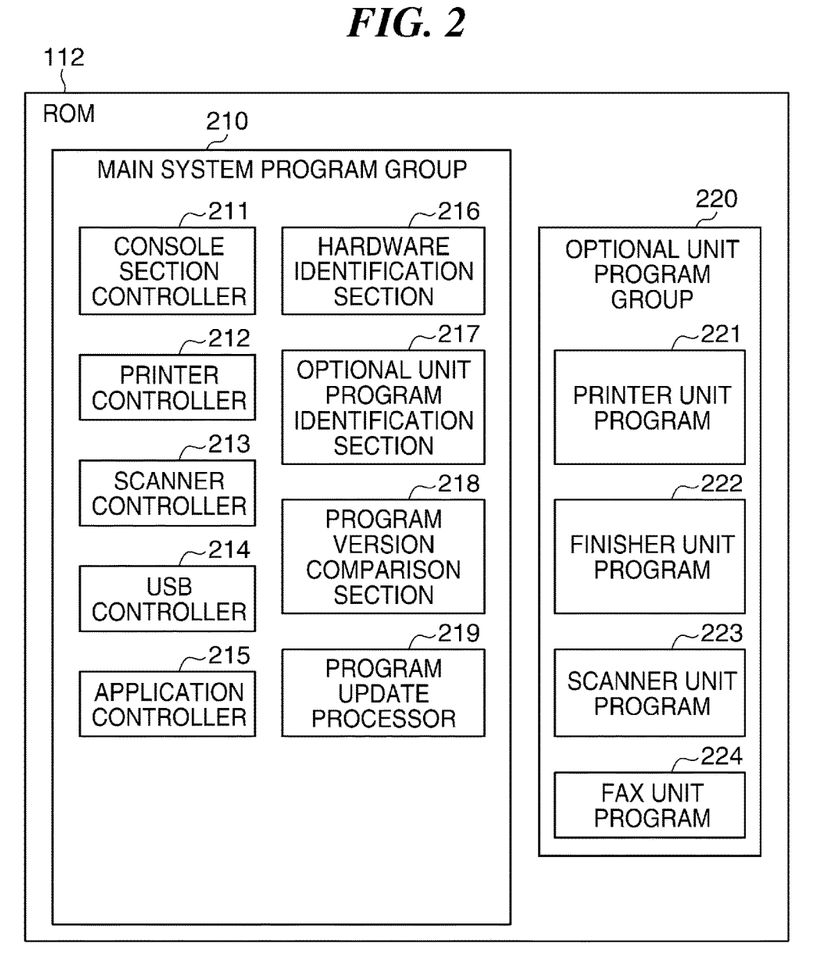
FIG. 2 is a diagram of program groups stored in a ROM of a controller unit appearing in FIG. 1.

FIG. 2 is a diagram of the program groups stored in the ROM 112 of the controller unit 110. The illustrated program groups are a main system program group 210 and an option unit program group 220.

Referring to FIG. 2, the main system program group 210 is comprised of programs for realizing various functions of the multifunction peripheral 100.

A console section controller 211 is a program for controlling the console section interface 116 and the console section 130. Similarly, the aforementioned printer controller 212 is the program for controlling the printer interface 117 and the printer unit 140. The aforementioned scanner controller 213 is the program for controlling the scanner interface 118 and the scanner unit 150. A USB controller 214 is a program for controlling the USB-Host interface 119, and the FAX unit 160 and the external USB device 184 which are connected to the USB-Host interface 119.

An application controller 215 is a program group not for directly controlling external devices but for realizing the various functions of the multifunction peripheral 100. The functions realized by the application controller 215 include httpd (Hyper Text Transfer Protocol Daemon), lpd (Line Printer Daemon), a Web browser function, an apparatus information distribution function, and so forth.

A hardware identification section 216 is a program for determining whether or not an optional unit connected to the multifunction peripheral 100 is compatible with a program of the main system program group 210. More specifically, when the optional unit is connected, the hardware identification section 216 acquires a hardware identifier stored in the ROM of the optional unit, and determines whether or not the optional unit is compatible with the program of the main system program group 210, i.e. whether or not the acquired hardware identifier matches a hardware identifier stored in the ROM 112 in association with the program of the main system program group 210. If there is a match, it indicate that the optional unit can be properly operated by the program of the main system program group 210. The hardware identifier (hardware identification information) acquired from the optional unit is used for identifying the optional unit so as to know whether or not the optional unit can be normally operated in combination with the functions of the multifunction peripheral 100, which is determined based on the configuration of the optional unit, such as the storage capacity of the ROM, sheet feed speed and sheet discharge speed, and the number of sheet discharge trays.

An optional unit program identification section 217 is a program for acquiring a model identifier, stored in the ROM of the optional unit and indicative of a model corresponding to the program stored in the optional unit, and determining whether or not the acquired model identifier matches a model identifier stored in the ROM 112 in association with the program of the main system program group 210. If there is a match, it indicates that the program stored in the ROM of the optional unit is compatible with the program of the main system program group 210. While the above-described hardware identifier is identification information for identifying whether or not the hardware arrangement of the optional unit is compatible with the program of the main system program group 210, the model identifier is program identification information for identifying which program of the main system program group 210 is corresponding to the program stored in the optional unit.

A program version comparison section 218 is a program for comparing a version of the program stored in the ROM of the optional unit, and a version of the program which is stored in the optional unit program group 220 of the ROM 112, for update of the program of the optional unit.

A program update processor 219 is a program for performing, when it is determined that program update is required, a program update process for updating programs stored in the ROM 112 of the controller unit 110 and the ROM of the optional unit.

The optional unit program group 220 is comprised of a printer unit program 221, a scanner unit program 223, a finisher unit program 222, and a FAX unit program 224. These programs are programs for use in respective optional units associated therewith for operation thereof, and are stored in the ROM 112 for updating the programs stored in the optional units. Hereafter, these programs are referred to as "optional unit programs" so as to distinguish them from those stored in the associated optional units.

The above-mentioned programs of the optional unit program group 220 stored in the ROM 112 are compatible with processing realized by the various programs (211 to 215) of the main system program group 210, and before shipment of the multifunction peripheral 100, optimum versions thereof at the time are stored in the ROM 112.

When the program update process is performed in response to an instruction from the user, the multifunction peripheral 100 acquires latest versions of programs of the main system program group 210 and latest versions of optional unit programs, e.g. from the server 183, thereby updating the programs of the main system program group 210 to the latest versions thereof, and the optional unit programs of the optional unit program group 220 to the latest versions thereof.

Note that the optional unit program of an optional unit that is connectable but is not currently connected to the controller unit 110 is also updated. By thus updating such an optional unit program, when the optional unit is additionally connected later, the program stored in the ROM of the connected optional unit can be updated to the latest version using the program stored in the ROM 112.

Figure 3:
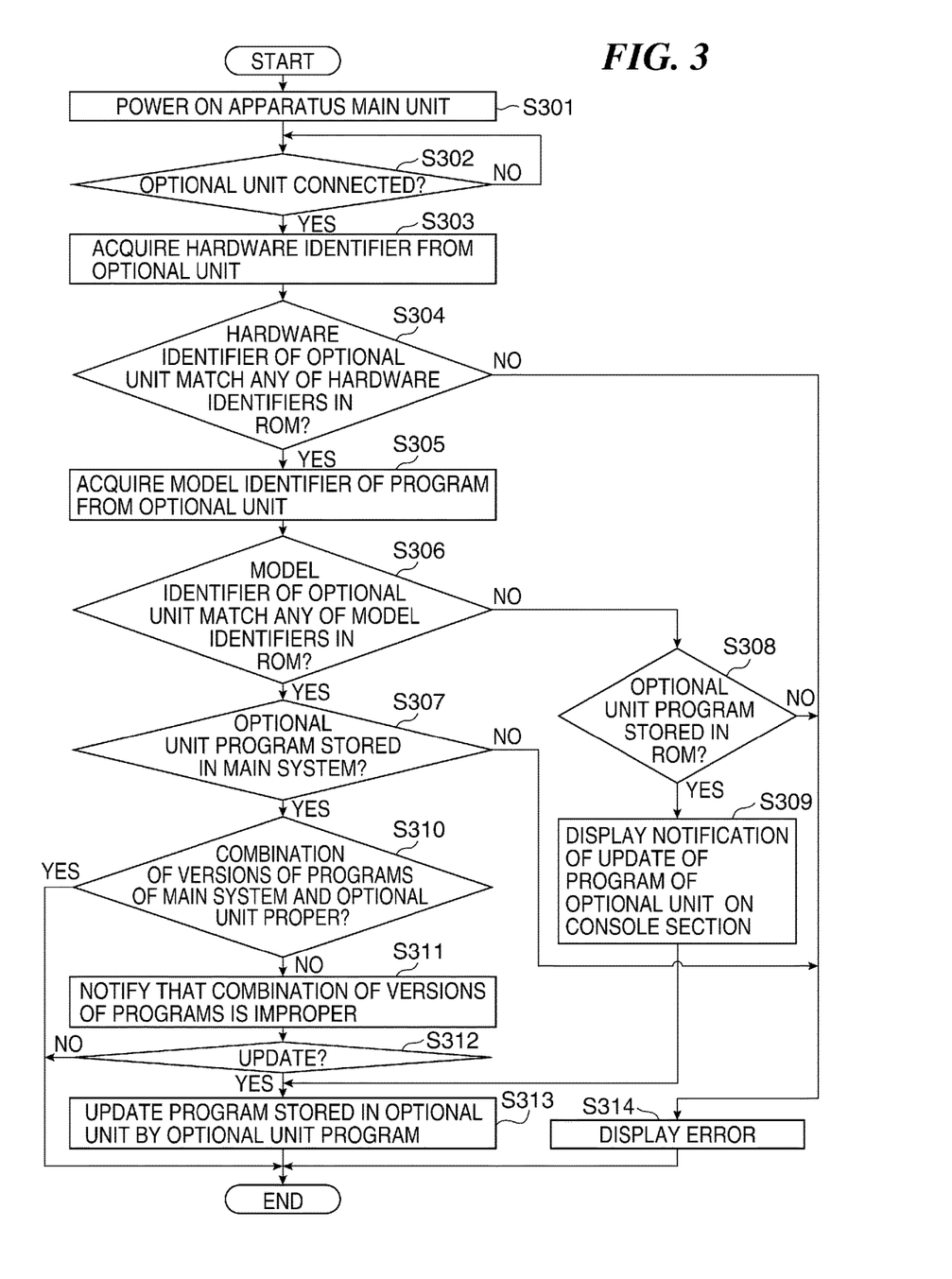
FIG. 3 is a flowchart of an optional unit program update process performed by the multifunction peripheral shown in FIG. 1.

FIG. 3 is a flowchart of an optional unit program update process performed by the multifunction peripheral 100. This process is realized by the CPU 111 which executes the programs read from the ROM 112.

First, when the main unit of the multifunction peripheral 100 is powered on (step S301), the CPU 111 determines whether or not an optional unit is connected to the multifunction peripheral 100 (step S302). If it is confirmed that an optional unit is connected to the multifunction peripheral 100, the process proceeds to a step S303, wherein the CPU 111 acquires a hardware identifier stored in the ROM of the optional unit in association with the program of the optional unit. The program may include the hardware identifier, and the CPU 111 may acquire the hardware identifier included in the program. Note that if it is confirmed that a plurality of optional units are connected to the multifunction peripheral 100, hardware identifiers are acquired from the respective optional units.

Next, in a step S304, the CPU 111 determines using the hardware identification section 216 whether or not the hardware identifier of the optional unit, acquired in the step S303, matches any of hardware identifiers stored in the ROM 112. If it is determined that the hardware identifier of the optional unit does not match any of the hardware identifiers stored in the ROM 112, the CPU 111 determines that an improper optional unit is connected to the multifunction peripheral 100 by mistake, and the process proceeds to a step S314, wherein an error screen shown in FIG. 4B is displayed on the console section 130, followed by terminating the present process.

As described above, if it is determined that the connected optional unit is not configured to be capable of being operated in cooperation with the main system, an error notification is transmitted to the user. To cause the apparatus main unit to correctly operate, it is required to connect a proper optional unit or stop connection of the optional unit. Thus, it is possible to prevent a malfunction of the optional unit from being caused by erroneous attachment of an optional unit by a user or a service technician.

On the other hand, if it is determined in the step S304 that the hardware identifier matches any of the hardware identifiers stored in the ROM 112, the process proceeds to a step S305, wherein the CPU 111 acquires a model identifier stored in the ROM of the optional unit in association with the program of the optional unit. The program of the optional unit may include the model identifier, and the CPU 111 may acquire the model identifier included in the program.

Next, in a step S306, the CPU 111 determines using the optional unit program identification section 217 whether or not the model identifier of the optional unit acquired in the step S305 matches any of model identifiers stored in the ROM 112. For example, assuming that a model identifier associated with the program of the main system program group 210 indicates "Model A", and the model identifier acquired from the optional unit connected to the multifunction peripheral 100 indicates "Model B", the answer to the question of the step S306 is negative (NO), and the process proceeds to a step S308. On the other hand, if it is determined in the step S306 that the model identifier matches any of the model identifiers, the process proceeds to a step S307.

Even when there is a match in hardware identifier in the step S304, but there is no match in model identifier in the step S306, it is possible to cause the apparatus main unit to operate, by rewriting the program. In this case, to cause the multifunction peripheral 100 to normally operate, it is required to rewrite the program for "Model B" stored in the ROM of the optional to the program for "Model A".

Therefore, in the step S308, the CPU 111 determines whether or not the optional unit program (program for the optional unit) is stored in the optional unit program group 220 of the ROM 112. If it is determined due to some reason that the optional unit program is not stored in the optional unit program group 220, the process proceed to the step S314, wherein the CPU 111 causes the error screen shown in FIG. 4B to be displayed on the console section 130, followed by terminating the present process.

Figure 4A:
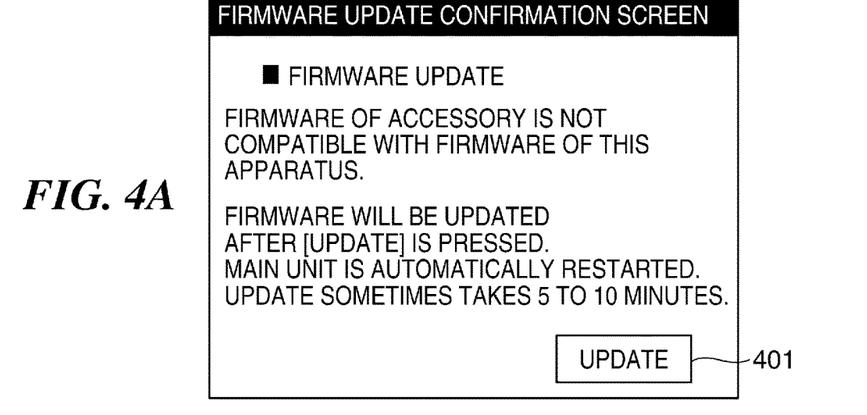
FIG. 4A shows a firmware update confirmation screen displayed in a step of the optional unit program update process in FIG. 3.
Figure 4B:
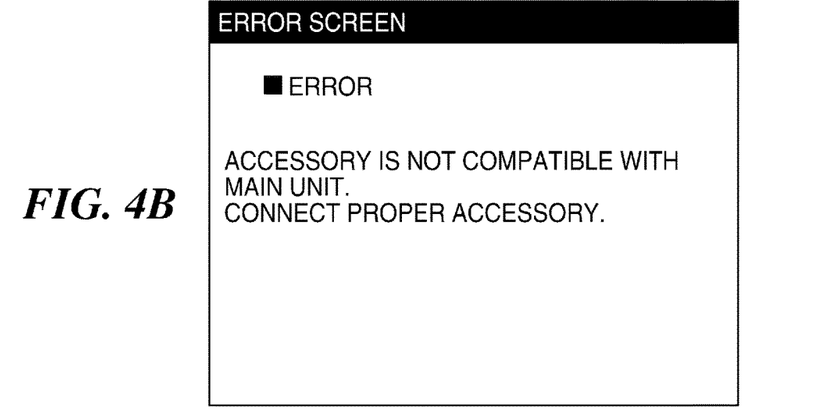
FIG. 4B shows an error screen displayed in a step of the optional unit program update process in FIG. 3.

If it is determined in the step S308 that the optional unit program is stored in the ROM 112, the process proceeds to a step S309, wherein the CPU 111 causes a notification screen shown in FIG. 4A to be displayed on the console section 130 for notifying the update of the program (firmware) of the optional unit.

The notification screen shown in FIG. 4A is displayed when it is determined that by rewriting the optional unit program, it is possible to cause the optional unit and the multifunction peripheral 100 to operate with a combination of the program of the optional unit and the program of the main system program group 210. In the illustrated example, an update button 401 is disposed, but neither cancel button nor skip button is disposed in order to prevent the multifunction peripheral 100 from continuing to be used in a state in which the models are mismatched. The screen shown in FIG. 4A is displayed in order to notify the user of the necessity of updating a program, and of the fact that the functions of the multifunction peripheral 100 cannot be used for a predetermined time period during the upgrade of the program to a later version. As described above, even if it is determined that the program of the optional unit is incompatible with the program of the main system program group 210, if it is determined by the hardware identification section 216 that the optional unit connected to the multifunction peripheral 100 is compatible with the program of the main system program group 210, the optional unit can be made operable by properly updating the program stored in the ROM of the optional unit.

Referring again to FIG. 3, the process proceeds from the step S309 to a step S313, wherein the CPU 111 performs the program update process by replacing the program stored in the ROM of the optional unit by the optional unit program stored in the ROM 112, i.e. overwriting the program stored in the ROM of the optional unit with the optional unit program, using the program update processor 219, followed by terminating the present process.

Similar to the step S308, in the step S307, the CPU 111 determines whether or not the optional unit program is stored in the ROM 112. If the optional unit program is not stored in the ROM 112, the process proceeds to the step S314, wherein the error display is performed.

On the other hand, if it is determined in the step 307 that the optional unit program is stored in the ROM 112, the process proceeds to a step S310.

In the step S310, the CPU 111 causes the program version comparison section 218 to perform comparison between the version of the optional unit program in the optional unit program group 220 and the version of the program stored in the ROM of the optional unit, to thereby determining whether or not a combination of the version of the program of the main system program group 210 and the version of the program of the optional unit is a proper combination. If it is determined that the combination of the versions of the programs is not proper, the present process is terminated. On the other hand, if it is determined that the combination of the versions of the programs is not proper, the process proceeds to a step S311, wherein the CPU 111 causes a notification screen (not shown) to be displayed on the console section 130 for notifying the user of the fact that the combination of the versions of the programs is not proper.

Next, in a step S312, the CPU 111 determines whether or not an update instruction has been received from the user via the console section 130. If the update instruction has been received, the process proceeds to the step S313.

In the step S313, the CPU 111 causes the program update processor 219 to update the program stored in the ROM of the optional unit, using the optional unit program of the option unit program group 210 stored in the ROM 112, i.e. overwrite the program stored in the ROM of the optional unit with the optional unit program.

If the update instruction has not been received in the step S312, the operation of the multifunction peripheral 100 is continued without performing the update process for updating the program stored in the ROM of the optional unit. Note that the notification screen indicating that the combination of the versions of the programs is not proper is displayed, and hence if the user who has connected the optional unit to the multifunction peripheral 100 has any means for updating the programs, the user can also correct the mismatch of the versions of the programs by performing an update operation. If the mismatch of the versions of the programs is not corrected, the optional unit program update process in FIG. 3 is performed next time when the main unit of the multifunction peripheral 100 is powered on, and hence the notification to the effect that the versions of the programs do not match is made in the step S311 again.

According to the above-described embodiment, it is determined whether or not the optional unit is compatible with the main system, based on the hardware identifier acquired from the optional unit. If it is determined that the optional unit is compatible with the main system, a model identifier associated with the program is acquired from the optional unit, and it is determined based on the model identifier whether or not the model of the optional unit and the model of the main system match each other. If it is determined that the models match each other, the version of the optional unit program and the version of the program of the main system are compared. If it is determined based on the result of the comparison that the combination of the version of the optional unit program and that of the program of the main system is not proper, the program of the optional unit is updated using the optional unit program which is compatible with the main system and is stored in the ROM 112, according to an instruction from the user. On the other hand, if it is determined that the models do not match, the program of the optional unit is updated using the optional unit program stored in the ROM 112. This guarantees the update of the program of the optional unit such that the operations of a model different in functions are realized, by causing a different program to be stored in the optional unit, and prevents a malfunction from being caused by erroneous attachment of the optional unit by a user or a service technician. Further, when the apparatus main unit and the optional unit are connected, the operation of the optional unit can be guaranteed by rewiring the program thereof, and hence it can be expected that the management of the optional unit is more efficiently performed.

Although in the above-described embodiment, the program update process is performed according to an update instruction from the user in the step S312 in FIG. 3, this is not limitative. For example, determination whether or not to update programs may be performed according to conditions set by the user in advance on a setting screen as shown in FIG. 4C.

Figure 4C:
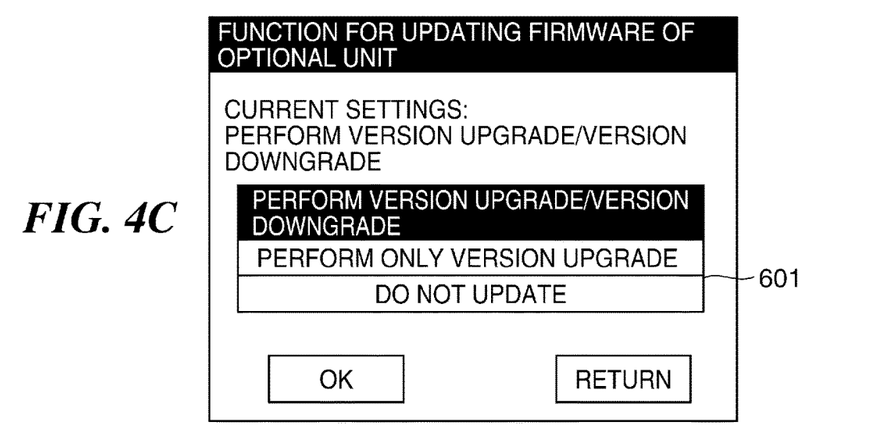
FIG. 4C shows an update setting screen for setting update of a program of the optional unit.

FIG. 4C shows an example of a screen for setting version upgrade/version downgrade of the version of a program stored in the ROM of the optional unit.

When the user desires that a proper combination of the program stored in the ROM of the optional unit and a program of the main system program group 210 is guaranteed, the user operates a setting selection section 601 on the setting screen shown in FIG. 4C, to thereby select an option "perform version upgrade/version downgrade". On the other hand, in a case where an optional unit storing a program of a later version is intentionally connected to the apparatus main unit, in order to prevent execution of the update (version downgrade, in this case, of the program of the optional unit), the user operates the setting selection section 601 to select an option "perform only version upgrade". Further, when desiring to maintain a combination of the version of a program of the main system program group 210 and the version of a program stored in the ROM of the optional unit, the user operates the setting selection section 601 to select an option "do not update". Further, when the optional unit has been connected before and the operation of the optional unit has been confirmed, and hence the user desires to use the optional unit as it is, the user o selects the option "do not update" by operating the setting selection section 601.

Next a second embodiment of the present invention will be described. The second embodiment is distinguished from the above-described first embodiment in that a process is added in which the multifunction peripheral 100 acquires the programs of the latest versions from the server 183. In the following, the same components as those of the first embodiment are denoted by the same reference numerals, and description thereof is omitted. The following description is given only of different points from the first embodiment.

Figure 5:
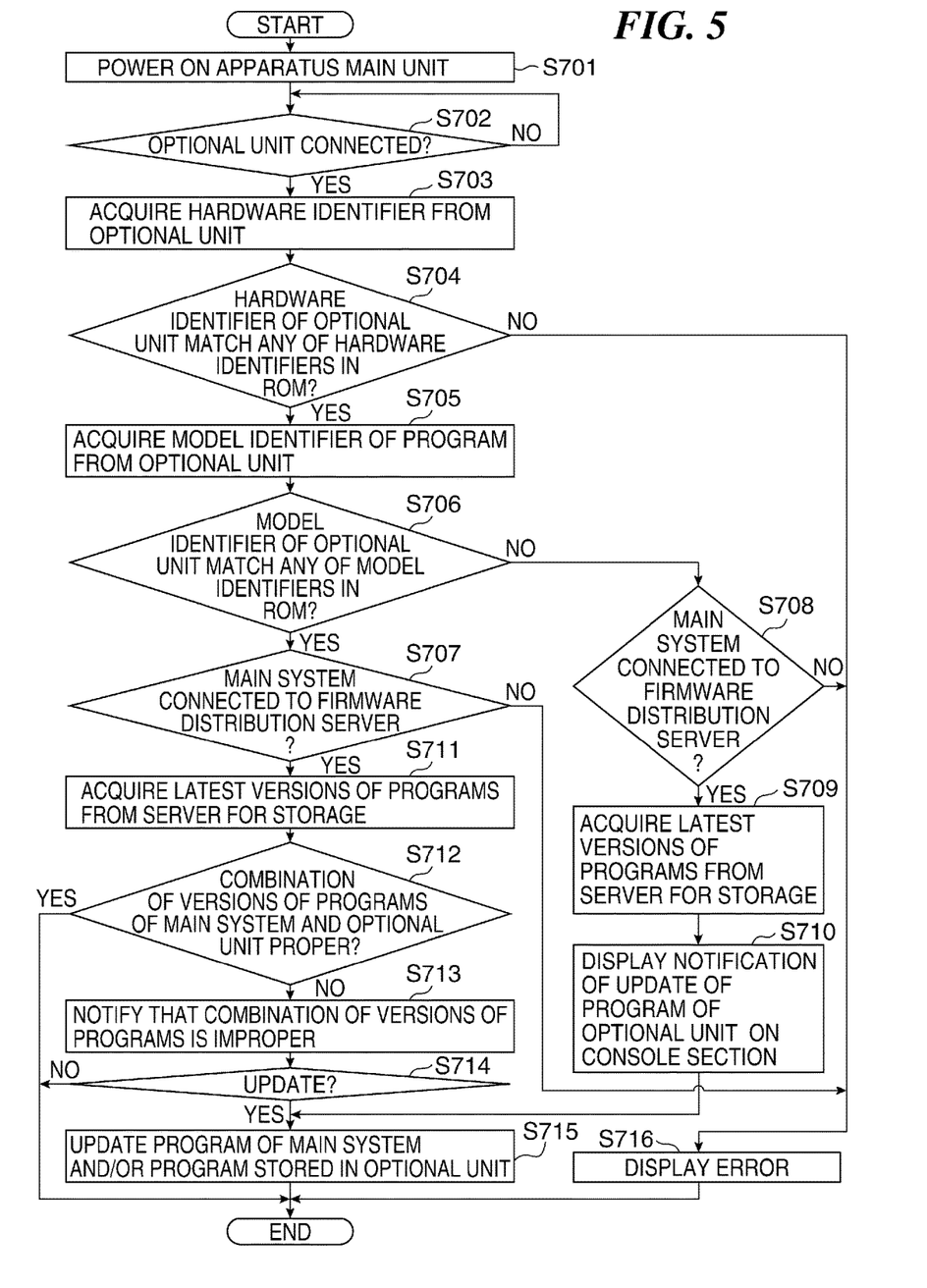
FIG. 5 is a flowchart of an optional unit program update process performed by a multifunction peripheral as a printing apparatus according to a second embodiment of the present invention.

FIG. 5 is a flowchart of an optional unit program update process performed by the printing apparatus according to the second embodiment of the present invention. The present process is realized by the CPU 111 which executes a program read out from the ROM 112. Note that steps S701 to S706 in FIG. 5 are the same as the steps S301 to S306 in FIG. 3, and hence description thereof is omitted.

In a step S707, the CPU 111 determines whether or not the multifunction peripheral 100 is communicably connected to the server 183. If it is confirmed that the multifunction peripheral 100 is communicably connected to the server 183, the process proceeds to a step S711.

In the step S711, the CPU 111 acquires the respective latest versions of the program of the main system program group 210 and the program stored in the ROM of the optional unit, and stores the latest versions of the programs in the ROM 112. Then, the process proceeds to a step S712. The step S712 to a step S714 are the same as the steps S310 to S312 in FIG. 3. In other words, there is performed the same processing as performed when it is determined in the step S307 that the optional unit program is stored in the main system. The latest versions of the programs necessary for the upgrade thereof have always been uploaded to the server, and hence, differently from the step S312, in a step S715, the program of the main system program group 210 and/or the program of the optional unit are updated to the latest versions, using the latest versions of the programs downloaded in the step S711.

Similar to the step S707, in a step S708, the CPU 111 determines whether or not the multifunction peripheral 100 is communicably connected to the server 183. If it is confirmed that the multifunction peripheral 100 is communicably connected to the server 183, the process proceeds to a step S709, wherein the CPU 111 acquires the latest versions of the programs of the main system program group 210 and the program of the optional unit. Then, in a step S710, the CPU 111 displays, on the console section 130, the notification screen shown in FIG. 4A for notifying the update of the program (firmware) of the optional unit. After that, in a step S715, the CPU 111 causes the program update processor 219 to perform update processing for updating the program stored in the ROM of the optional unit, and if necessary, the program of the main system program group 210.

Note that similar to the steps S307 and S308 in FIG. 3, in the steps S707 and S708, if it is not confirmed that the multifunction peripheral 100 is communicably connected to the server 183, the error screen is displayed (step S716).

The screens displayed on the console section 130 in the respective steps S710 and S716 are the same screens shown in FIGS. 4A and 4B, respectively. More specifically, in the step S710, the notification screen (FIG. 4A) for notifying the user of the program update processing, and in the step S716, the notification screen (FIG. 4B) for notifying the user of the error.

According to the above-described embodiment, it is possible to obtain the same advantageous effects as provided by the first embodiment.

Although in the above-described first and second embodiments, the description has been given of the case where the optional unit program update process shown in each of FIGS. 3 and 5 is performed when the apparatus main unit is first powered on, the process may be performed when it is detected that a new optional unit has been connected to the apparatus main unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100379 filed May 14, 2014 which is hereby incorporated by reference herein in its entirety.

What is claimed is:

1. A printing apparatus comprising:
a printing unit configured to perform printing, the printing unit configured to be connected to a finisher unit that performs finishing processing on sheets on which printing has been performed;
a memory configured to store a finisher unit program for controlling the finisher unit, wherein the memory stores the finisher unit program for controlling the finisher unit prior to the finisher unit being connected to the printing unit; and
one or more processors configured to execute instructions that, when executed, cause the printing apparatus to:
acquire hardware identification information, stored in a memory of the finisher unit from the finisher unit after the finisher unit is connected to the printing unit;
determine whether or not the acquired hardware identification information corresponds to hardware identification information stored in the memory of the printing apparatus;
in a case where it is determined that the acquired hardware identification information corresponds to hardware identification information stored in the memory of the printing apparatus, acquire, from the finisher unit, a model identifier of a program stored in the memory of the finisher unit; and
based on a determination result whether or not the acquired model identifier corresponds to a model identifier of the program of the printing apparatus stored in the memory of the printing apparatus, upload the program stored in the memory of the finisher unit.

2. The printing apparatus according to claim 1, further comprising a display unit configured to display a notification screen which prompts a user to upload the finisher unit program for controlling the finisher unit from the finisher unit to the printing apparatus in a case where it is determined that the finisher unit program is compatible with the program of the printing apparatus.

3. The printing apparatus according to claim 1, wherein the finishing processing performed by the finisher unit is one of stapling processing, punching processing, or saddle-stitch bookbinding processing.

4. A program upload method for a printing apparatus including a printing unit configured to perform printing, the printing unit configured to be connected to a finisher unit that performs finishing processing on sheets on which printing has been performed, and a memory configured to store a finisher unit program for controlling the finisher unit, wherein the memory stores the finisher unit program for controlling the finisher unit prior to the finisher unit being connected to the printing unit, the program upload method comprising:
acquiring hardware identification information, stored in a memory of the finisher unit, from the finisher unit after the finisher unit is connected to the printing unit;
determining whether or not the acquired hardware identification information corresponds to hardware identification information stored in the memory of the printing apparatus;
in a case where it is determined that the acquired hardware identification information corresponds to hardware identification information stored in the memory of the printing apparatus, acquiring, from the finisher unit, a model identifier of a program stored in the memory of the finisher unit; and
based on a determination result whether or not the acquired model identifier corresponds to a model identifier of the program of the printing apparatus stored in the memory of the printing apparatus, uploading the program stored in the memory of the finisher unit.

5. A non-transitory computer-readable storage medium storing a computer-executable program for executing a program upload method for a printing apparatus including a printing unit configured to perform printing, the printing unit configured to be connected to a finisher unit that performs finishing processing on sheets on which printing has been performed, and a memory configured to store a finisher unit program for controlling the finisher unit, wherein the memory stores the finisher unit program for controlling the finisher unit prior to the finisher unit being connected to the printing unit, the program upload method comprising:
acquiring hardware identification information, stored in a memory of the finisher unit, from the finisher unit after the finisher unit is connected to the printing unit;
determining whether or not the acquired hardware identification information corresponds to hardware identification information stored in the memory of the printing apparatus;
in a case where it is determined that the acquired hardware identification information corresponds to hardware identification information stored in the memory of the printing apparatus, acquiring, from the finisher unit, a model identifier of a program stored in the memory of the finisher unit; and
based on a determination result whether or not the acquired model identifier corresponds to a model identifier of the program of the printing apparatus stored in the memory of the printing apparatus, uploading the program stored in the memory of the finisher unit.

* * * * *